UNITED STATES PATENT OFFICE.

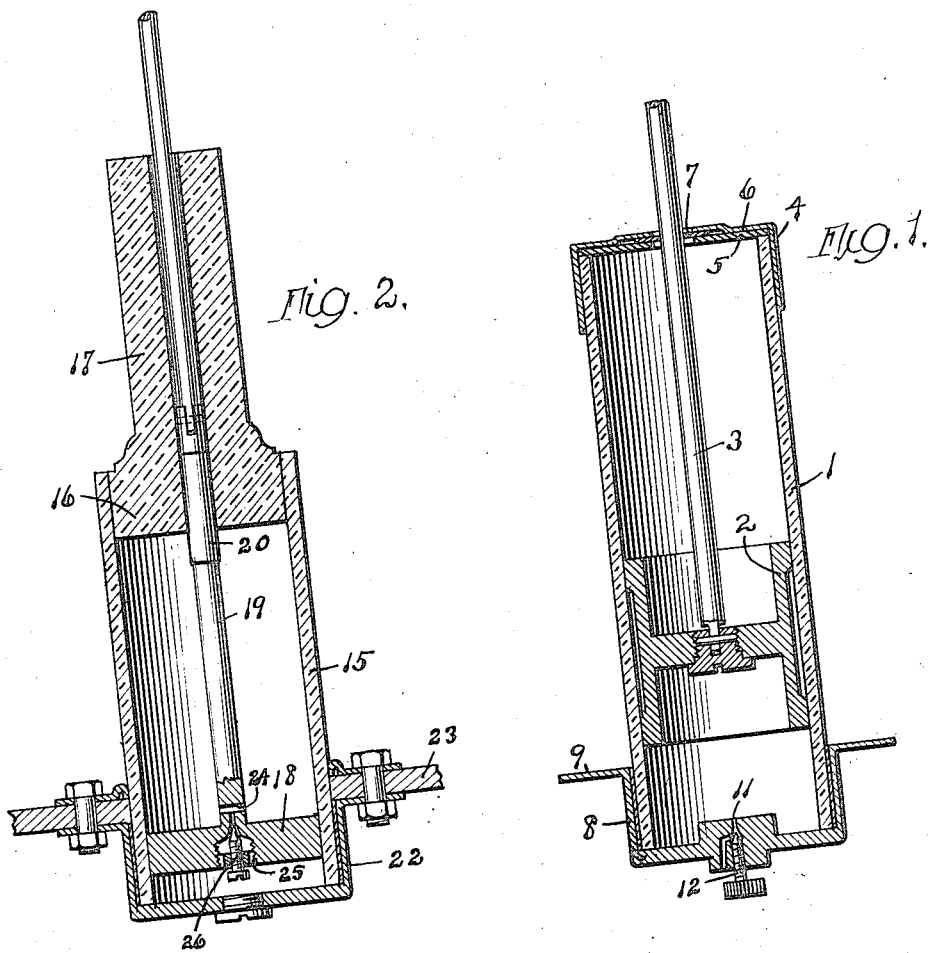

FREMONT H. BUCKINGHAM, OF DETROIT, MICHIGAN, ASSIGNOR TO THE STANDARD COMPUTING SCALE COMPANY, OF DETROIT, MICHIGAN, A CORPORATION OF MICHIGAN.

DASH-POT.

1,212,322.             Specification of Letters Patent.      Patented Jan. 16, 1917.

Application filed March 31, 1916. Serial No. 87,920.

*To all whom it may concern:*

Be it known that I, FREMONT H. BUCKINGHAM, a citizen of the United States, and residing at Detroit, in the county of Wayne and State of Michigan, have invented a new and Improved Dash-Pot, of which the following is a specification.

This invention relates to dashpots especially adapted for high class scales, computing machines and other machines where efficiency and ease of operation are of first importance, and it consists primarily in a cylinder and a piston, preferably of non-corrosive metal, which fit each other so closely that the air between them may act as a lubricant.

It further consists of the details of construction illustrated in the accompanying drawing and particularly pointed out in the claims.

In the drawing, Figure 1 is a central longitudinal section of one form of this invention. Fig. 2 is a modification thereof.

Similar reference characters refer to like parts in both views.

The cylinder 1 of the dashpot shown in Fig. 1 is a tube of very hard material, preferably glass, carefully ground, and within it is slidable a piston of hard metal 2, preferably of Monel metal, an alloy of copper, nickel and iron which is substantially non-corrosive and very hard. The piston is preferably reduced in diameter intermediate its ends, and the diameter of the ends is preferably about one-ten-thousandth less than the bore of the cylinder. This difference is so slight that it prevents air from passing from one end of the cylinder to the other although a very thin film of air is retained between the piston and the cylinder and acts as a lubricant between them held in place by friction.

One end of the piston rod 3 is connected to the piston while the other end connects in any desired manner to the object to be controlled. A cap 4 may fit over one end of the cylinder and be provided with a double end formed by the parts 5 and 6, between which the plate 7 is slidable, the holes in the parts 5 and 6 being larger than the piston rod while the hole in the plate 7 is substantially of the same diameter as the rod. This device prevents the entrance of dust. The opposite end of the cylinder is secured in a cup 8 of metal having wings, lugs or radial flange 9 to support the cylinder. A small passage 11 in the bottom of this cup permits air to pass in and out of the adjacent end of the cylinder, the rate of flow being controlled by the small needle valve 12.

In the structure shown in Fig. 2, the cylinder 15 is formed with head 16, from which extends the guide 17, integral with the head and bored co-axially with the cylinder. The piston 18 makes the same close fit with the cylinder as before described, and the piston rod 19 may be formed with an enlargement 20 that also fits so closely within the bore of the guide 17 as to prevent any passage of air from the space between it and the piston 18. The cylinder is mounted in a cap 22 that may be secured to any proper support 23 in any desired manner. The piston rod and piston may be formed with air passages 24 and 25 that permit the flow of air to and from the space between the enlargement 20 and the piston, a needle valve 26 controlling the rate of this flow.

I claim:—

1. In a dash pot, the combination of a cylinder of glass and a piston of hard non-corrosive metal.

2. In a dash pot, the combination of a cylinder of glass and a piston of hard non-corrosive metal, and means to control the escape of air from one end of the cylinder.

3. In a dash pot, the combination of a cylinder of glass and a piston of metal within the cylinder, the diameter of the piston being so nearly the diameter of the cylinder as to substantially prevent the passage of air between them when the adjacent surfaces of both are clean.

4. In a dash pot, the combination of a cylinder of glass having a tubular guide of glass at one end co-axial therewith, a piston within the cylinder, and a piston rod connected to said piston and extending out through said tubular guide, said rod being formed to make substantially an air-tight fit with the bore of said guide.

5. In a dash pot, the combination of a cylinder of glass having a tubular guide of glass at one end co-axial therewith, a piston within the cylinder, a piston rod connected to said piston and extending out through said tubular guide, said rod being formed to make an air-tight fit with the bore of said guide, and said piston forming an airtight fit with the bore of said cylinder.

6. In a dash pot, the combination of a cylinder of glass having a tubular guide of glass at one end co-axial therewith, a piston within the cylinder, a piston rod connected to said piston and extending out through said tubular guide, said rod being formed to make an air-tight fit with the bore of said guide, said piston forming an air-tight fit with the bore of said cylinder, and means to control the flow of air from one end of the cylinder.

FREMONT H. BUCKINGHAM.